United States Patent
Rane et al.

(10) Patent No.: US 10,049,059 B2
(45) Date of Patent: Aug. 14, 2018

(54) DEVICE WITH MAGNET(S) FOR ENGAGING WITH ANOTHER DEVICE

(71) Applicant: Lenovo (Singapore) Pte. Ltd., New Tech Park (SG)

(72) Inventors: Peter Carlson Rane, Cary, NC (US); Ali Kathryn Ent, Raleigh, NC (US); Thomas Perelli, Raleigh, NC (US); Vincent Charles Conzola, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 275 days.

(21) Appl. No.: 14/979,180

(22) Filed: Dec. 22, 2015

(65) Prior Publication Data

US 2017/0179640 A1    Jun. 22, 2017

(51) Int. Cl.
*G06F 13/00* (2006.01)
*G06F 13/10* (2006.01)
*G06F 13/28* (2006.01)

(52) U.S. Cl.
CPC ............ *G06F 13/102* (2013.01); *G06F 13/28* (2013.01)

(58) Field of Classification Search
USPC ......................................... 710/33, 36–38, 31
See application file for complete search history.

(56) References Cited

U.S. PATENT DOCUMENTS

| 7,747,797 | B2 * | 6/2010 | Abraham | G06F 21/79 709/230 |
| 8,478,912 | B2 * | 7/2013 | Liu | G06F 1/1613 710/316 |
| 2013/0067117 | A1 * | 3/2013 | Peng | G06F 1/1632 710/2 |
| 2015/0046608 | A1 * | 2/2015 | Dua | H04N 7/163 710/33 |
| 2015/0081944 | A1 * | 3/2015 | An | H01R 13/6205 710/300 |
| 2015/0205750 | A1 * | 7/2015 | Hendin | G06F 13/4221 713/155 |
| 2015/0293860 | A9 * | 10/2015 | Bowles | G06F 13/10 710/33 |
| 2015/0339079 | A1 * | 11/2015 | Foo | G06F 13/385 710/33 |

* cited by examiner

*Primary Examiner* — Raymond Phan
(74) *Attorney, Agent, or Firm* — John L. Rogitz; John M. Rogitz

(57) ABSTRACT

In one aspect, a first device includes a housing, at least one system component housed by the housing, a connector coupled to the housing that engages with a second device for exchange, between the first device and the second device, of at least one of data and power, and a first magnet coupled to the housing. The first magnet is coupled to the housing so that a first pole of the first magnet faces away from the first device to repel a first pole of a second magnet coupled to the second device when the first device is juxtaposed next to the second device in a first orientation relative to the second device.

18 Claims, 7 Drawing Sheets

DEVICE WITH MAGNET(S) FOR ENGAGING WITH ANOTHER DEVICE

FIELD

The present application relates generally to devices with magnets for engaging other devices.

BACKGROUND

As recognized herein, it is often difficult to align two devices properly to engage them with each other. As also recognized herein, misaligning two devices when trying to engage them with each other can lead to a failure to properly connect the two devices, and can also damage one or both devices. There are currently no adequate solutions to the foregoing.

SUMMARY

Accordingly, in one aspect a first device includes a housing, at least one system component housed by the housing, a connector coupled to the housing that engages with a second device for the at least one system component to exchange at least one of data and power with the second device, and a first magnet coupled to the housing. The first magnet is positioned on the first device to attract a second magnet coupled to the second device when the first device is placed in a first orientation relative to the second device. The first magnet is also positioned on the first device to repel a third magnet coupled to the second device when the first device is placed in a second orientation relative to the second device.

In another aspect, a method includes providing a housing on a first device, providing at least one system component housed by the housing, providing a connector coupled to the housing that engages with a second device for exchange, between the first device and the second device, of at least one of data and power, and providing a first magnet coupled to the housing. The first magnet is coupled to the housing so that a first pole of the first magnet faces away from the first device to repel a first pole of a second magnet coupled to the second device when the first device is juxtaposed next to the second device in a first orientation relative to the second device.

In still another aspect, a system includes a housing on a first device, at least one system component housed by the housing, a connector coupled to the housing that engages with a second device for exchange, between the first device and the second device, of at least one of data and power, and a first magnet coupled to the housing. The first magnet is coupled to the housing so that a first pole of the first magnet faces away from the first device to repel a first pole of a second magnet coupled to the second device when the first device is juxtaposed next to the second device in a first orientation relative to the second device.

The details of present principles, both as to their structure and operation, can best be understood in reference to the accompanying drawings, in which like reference numerals refer to like parts, and in which:

DETAILED DESCRIPTION

Figure 1:
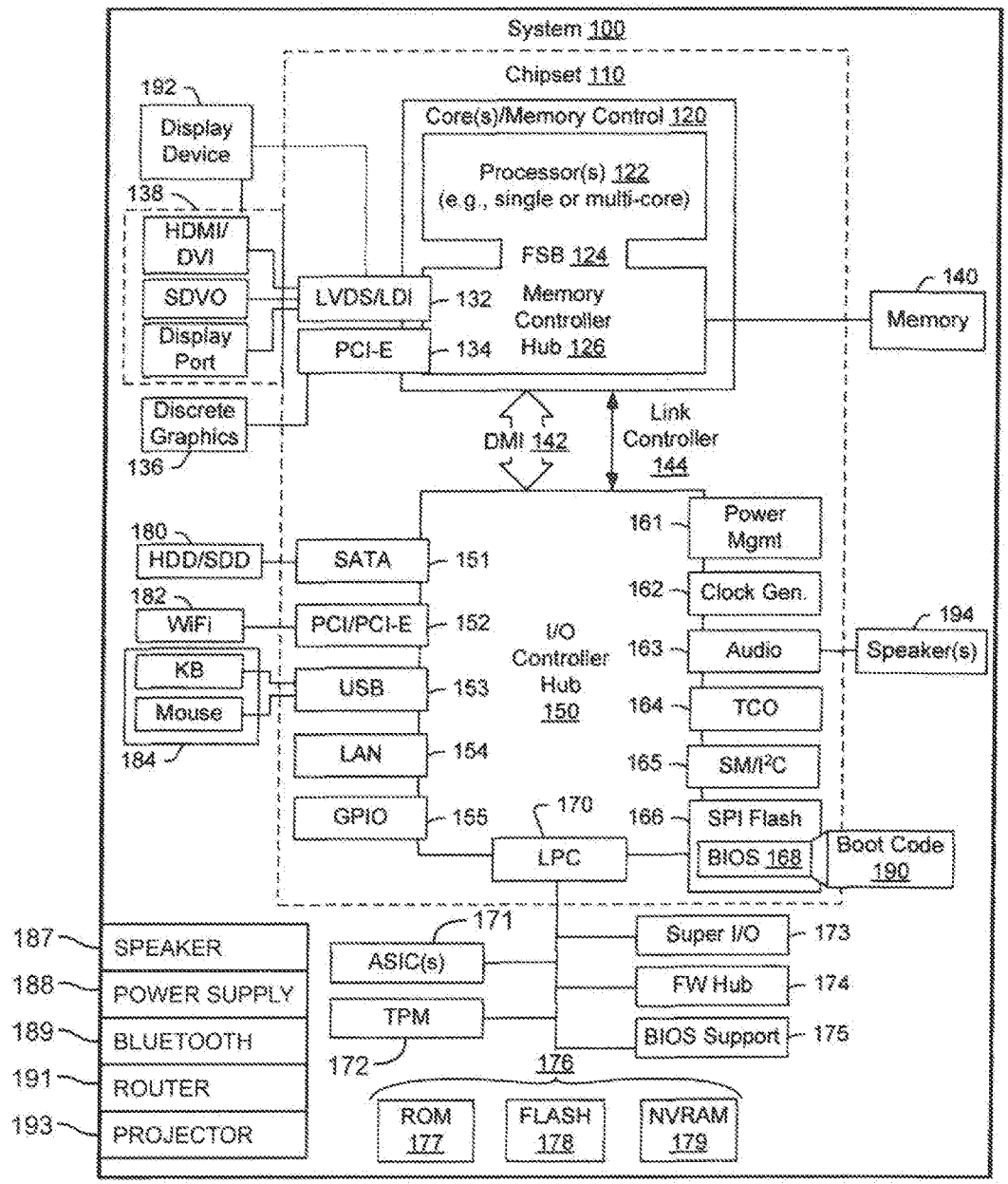
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the internet servers over a network such as the internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described, by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium.

Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A-system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc,).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video. HDMI/DVI, display port). The memory controller huh 126 also includes one or more PP-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still in reference to the system 100, the system 100 may also comprise one or more other system components, such as a Bluetooth communication-enabled speaker 187, a power supply and/or power bank 188 such as a battery, a Bluetooth and/or Bluetooth low energy (BLE) communication element 189 (e.g., a Bluetooth 4.0 communication element) for communicating with other devices using Bluetooth communication protocols, a router 191 for facilitating access by other devices to the Internet via the renter 191, and a projector 193 for projecting images from the system 100 onto another surface (such as a Pico projector).

Additionally, though now shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood, that another suitable position receiver other than a GPS receiver may be used in accordance with present principles to determine the location of the system 100.

It is to be understood that an example client, device or other machine/computer may include fewer or more features than shown on the system 100 of FIG. 1. In any case, it is to be understood at least based on the foregoing that the system 100 is configured to undertake present principles.

Figure 2:
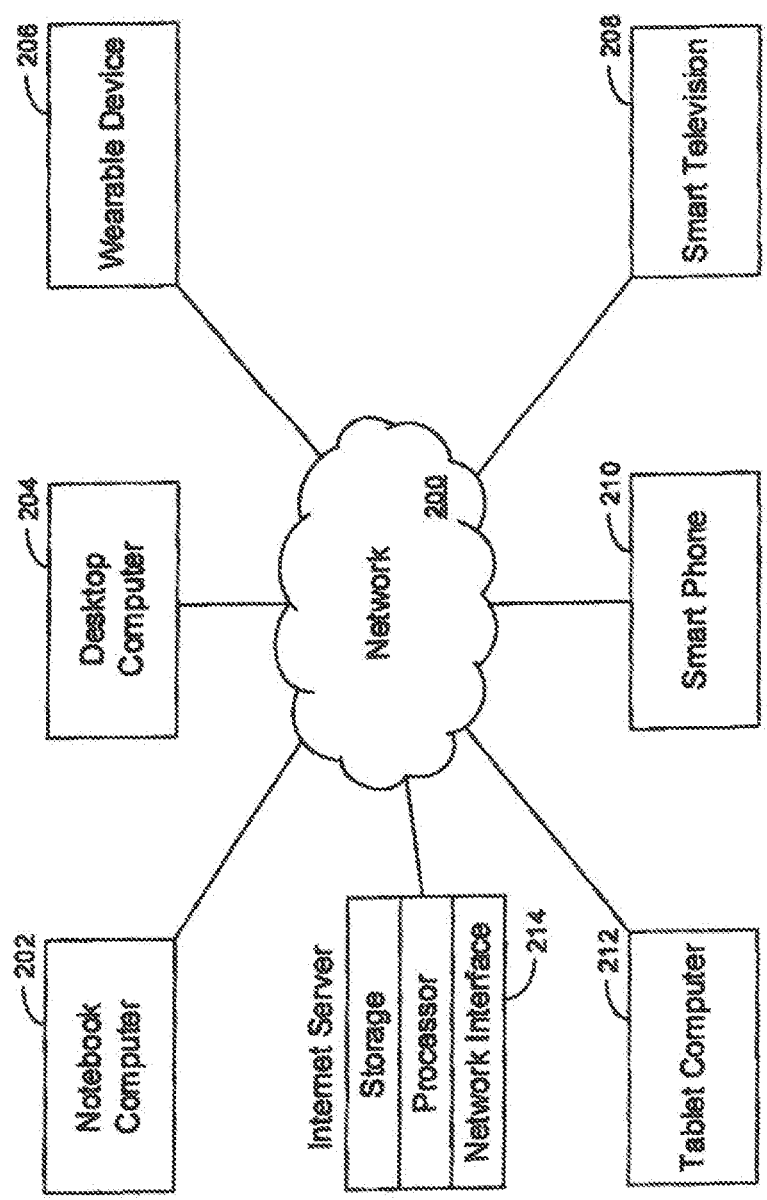
FIG. 2 is a block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
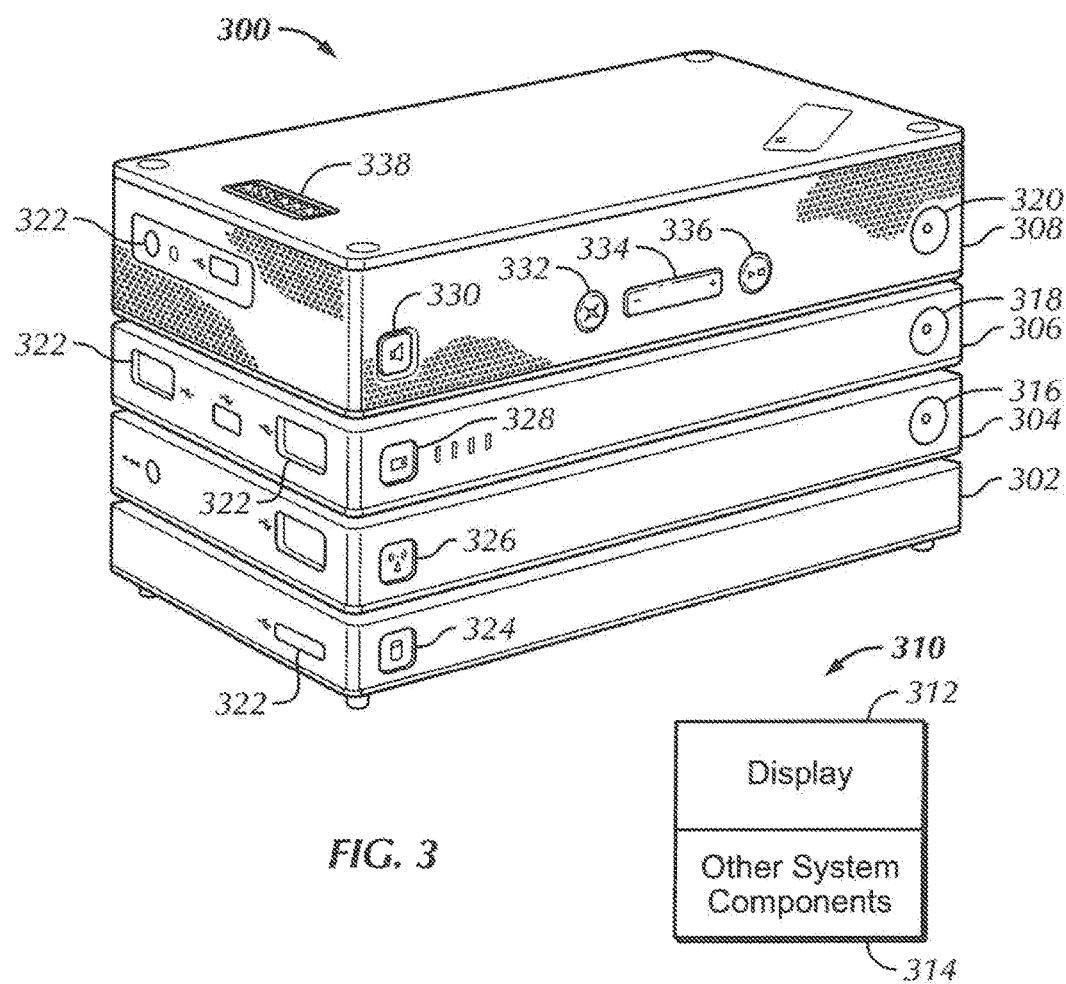
FIG. 3 is a perspective view of a device stack in accordance with present principles.

Referring to FIG. 3, it shows a perspective view of an example computing stack 300 in accordance with present principles. The computing stack 300 may comprise one or more devices 302-308, with some stacked top to bottom on top of each other as shown. The devices 302-308 may exchange data and power with others of the devices 302-308, and may each respectively communicate wirelessly with a computer 310 via a network interface and/or wireless transceiver on the respective device, such as to provide enhanced computing capabilities to the computer 310. The computer 310 may be a laptop, a smart, phone, a tablet computer, a wearable computer such as a smart watch, a convertible computer having, e.g., a tablet configuration and laptop configuration, etc. The computer 310 may comprise a display 312 and other system components 314, such as a processor, storage, a network interface and/or wireless transceiver, a keyboard, a track, pad, a Bluetooth communication transceiver, etc.

Thus, it is to be understood that each of the devices 302-308 may communicate wirelessly with the computer 310 via Bluetooth communication, near field communication (NFC), Wi-Fi (e.g., Wi-Fi direct), etc., and/or may communicate with the computer 310 using a wired connection such as micro-USB 3.0. It is to be therefore be further understood that each of the devices 302-308 may have housed therein one or more of a Bluetooth communication transceiver, an NFC transceiver, and a USB interface for facilitating a wired connection to the computer 310.

Furthermore, in some embodiments, each of the devices 302-308 may have a components and corresponding functionality different from the other devices 302-308. For instance, the device 302 may comprise a hard drive, the device 304 may comprise a Wi-Fi router (e.g., for receiving Internet service from and/or providing Internet service to the computer 310), and the device 306 may comprise a power supply and/or power bank for providing power to the other devices 302, 304, 308 when stacked and engaged therewith, and even the computer 310 in some embodiments (e.g., via a power supply line that may connect the computer 310 to a portion, of the stack 300 such as the device 306 itself). Also, note that the device 308 may comprise a speaker for playing audio based on audio signals received from the computer 310.

Further still, at least some of the de vices 302-308 may each have a processor and storage that stores software code and/or instructions for executing one or more functions, as well as on/off buttons for powering the respective devices on and off, such as the device 304 having an on/off button 316, the device 306 having an on/off button 318, and the device 308 having an on/off button 320. Each of the devices 302-308 may also comprise one or more ports 322 for facilitating a wired connection with the computer 310, such as USB ports, audio line ports, etc.

Each device 302-308 may also have at least one emblem denoting a functionality of the respective device. For instance, the device 302 may have an emblem 334 showing a symbol tor a hard drive to represent that the device 302 comprises a hard drive. The device 304 may have an emblem 326 showing representations of wireless transmissions from a tower to represent that the device 304 comprises a router.

The device 306 may have an emblem 328 showing a symbol for a battery to represent that the device 306 comprises a power supply. The device 308 may have an emblem 330 showing a symbol for a speaker to represent that the device 308 comprises a speaker. Also note that as shown in FIG. 3, the device 308 may comprise a mute button 332 and volume raise/lower button 334, as well as a play/pause/stop button 336.

Still in reference to FIG. 3, it is to be understood that the sequence in which the devices 302-308 are stacked may be interchangeable. For instance, though FIG. 3 shows the devices stacked, from bottom to top relative to earth, in the sequence of device 302, device 304, device 306, and device 308, the devices may be stacked in another sequence, such as (again from bottom to top) device 304, device 308, device 302, and device 306. The devices 302-308 may be stacked interchangeably and still exchange data and power wish others of the devices 302-308 (while the exchanging devices are engaged with each other) via connectors, such as pogo-pin connectors, respectively positioned each of the devices 302-308 that may engage with reciprocal connectors on the others of the devices 302-308.

One such connector 338 is shown on a top-facing side of the device 308 relative to the perspective view of the stack 300 that is shown. However, it is to be understood that the device 308 may also have another connector on an opposing, bottom-facing side of the device 308 for engagement with a connector on a top-facing side of the device 306 that may contact the bottom-facing side of the device 308. Thus, it is to be understood that in some embodiments, each of the devices 302-308 may have plural connectors (e.g., one on a top side, and one on a bottom side) for connecting to connectors on the other devices 302-308 when stacked so that respective connectors on the respective devices may engage each other for the respective devices to exchange power (e.g., from the power supply device 308) and/or data between the respective devices and others of the devices 302-308 that may be connected in a stack. It is to also be understood that in some embodiments, such connectors may comprise one or more pogo pins for exchanging data and power while the connectors are joined and/or interlocked together.

Figure 4:
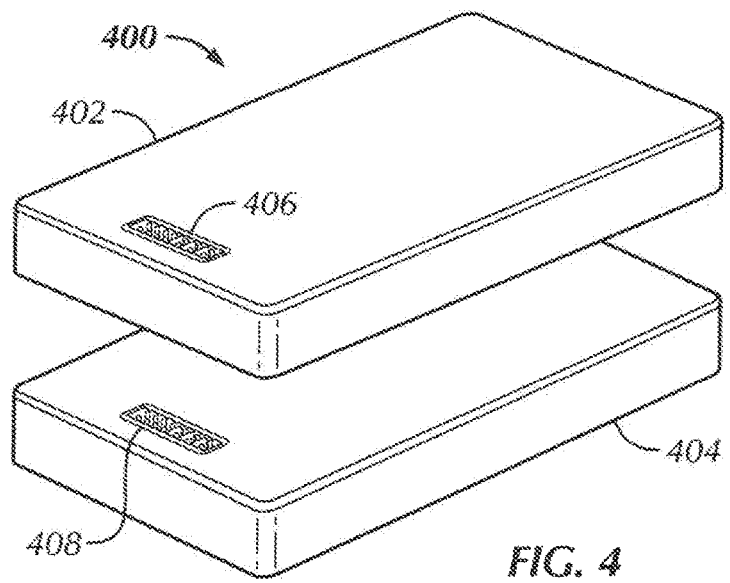
FIGS. 4 and 5 are perspective views respectively illustrating proper and improper device orientations in accordance with present principles.
Figure 5:
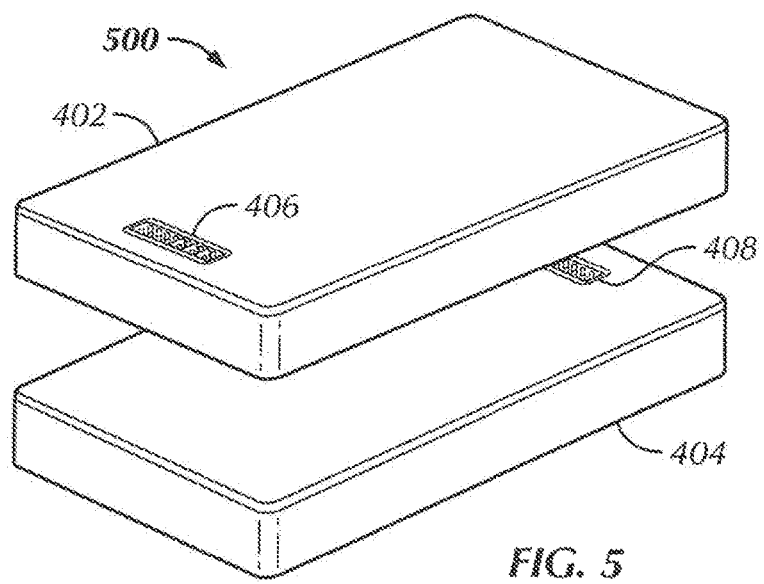

Before moving on to the description of FIGS. 4 and 5, it is to be understood in reference to FIG. 3 that still other devices may be included in the stack 300. For instance, a device having a projector for projecting images and at least substantially the same external dimensions as the other devices 302-308 may be connected to the stack 300.

Now in cross-reference to FIGS. 4 and 5, block diagrams 400 and 500 are respectively shown of a device 402 and device 404 that may be substantially similar in function and configuration to any of the devices 302-308 described above. Additionally, the devices 402 and 404 may respectively comprise connectors and magnets on opposing faces of each device, including a connector 406 on one side of the device 402 and a connector 408 on one side of the device 404. When the devices 402, 404 are placed in a first orientation relative to each other as shown in FIG. 4 and then attracted together via magnets that will be described shortly, the connector 408 may engage with a connector (not shown) on the bottom side the device 402 facing the side of the device 404 bearing the connector 408. Thus, it is to be understood, that connectors on opposing sides of a device may be juxtaposed on the device so that they mirror each other in that they may be located at least substantially at the same location on each respective face at the same end of the device relative to a longitudinal axis of the device.

However, when the devices 402, 404 are placed in a second orientation relative to each other as shown in FIG. 5 and then attempted to be placed together, the connector 408 cannot engage with the connector (that is not shown) on the bottom side the device 402 in part because the connector on the bottom-facing side of the device 402 is juxtaposed on a segment of the device 402 that is not proximate to the connector 408 of the device 404 in the orientation shown. Furthermore, in accordance with present principles, respective magnets on the bottom side of the device 402 and top side of the device 404 (that are not shown in FIGS. 4 and 5 for simplicity but examples of which will be described below) may repel a portion of the device 402 from a portion of the device 404 when juxtaposed in the second orientation shown in FIG. 5 so that it is made difficult to even attempt to engage the device 402 with the device 404 in the second orientation.

Figure 6:
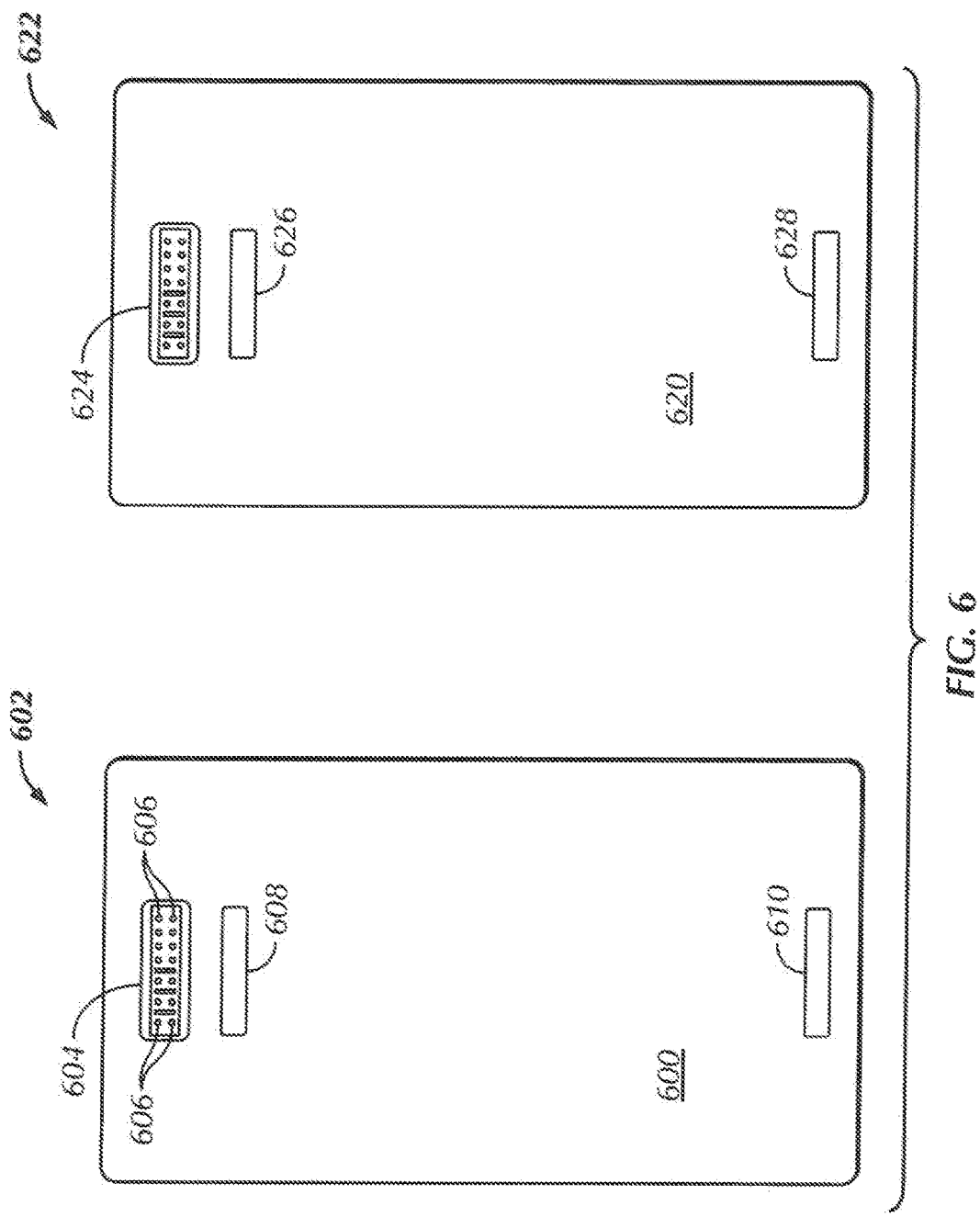
FIGS. 6 and 7 are block diagrams of devices in accordance with present principles.

Now in reference to FIG. 6, it shows a side 600 of a housing of a device 602 that may be substantially similar in function and configuration to any of the devices 302-308 described above. As may be appreciated from FIG. 6, the side 600 has a connector 604 coupled to the housing of the device 602 so that it is accessible via the side 600, exposed from the side 600, and/or faces away from the side 600 to engage with another device for the device 602 to exchange data and/or power with the other device in accordance with present principles. Note that the connector 604 may have one or more pogo pins 606 as shown.

Also shown coupled to the side 600 are a first magnet 608 and a second magnet 610. It is to be understood that the first magnet 608 may be coupled to the side 600 so that a pole of the first magnet 605 faces away from the device 602, while the second magnet 610 may be coupled to the side 600 so that a pole of the second magnet 608 faces away from the device 602. It is to be further understood that in at least some embodiments, the pole of the second magnet 610 that faces away from the device 602 may be of a different pole type than the pole of the first magnet 608 that also faces away from the device 602 as shown. For instance, the pole of the second magnet 610 that faces away from the device 602 may be a north pole, while the pole of the first magnet 608 that also faces away from the device 602 may be a south pole.

Thus, to provide an example, suppose the side 600 is a top side of a device in accordance with present principles. A bottom side 620 of a housing of another device 622 may have a connector 624 reciprocal to the connector 604 that is coupled to the housing of the device 622 to engage the connector 604 to exchange data and/or power between the devices 602, 622 in accordance with present principles. The side 620 may also bear a third magnet 626 and a fourth magnet 628, with the third magnet 626 coupled to the side 620 so that a pole of the third magnet 626 faces away from the device 620, while the fourth magnet 628 may be coupled to the side 620 so that a pole of the fourth magnet 628 faces sway from the device 620. Furthermore, it is to be understood that the pole of the first magnet 608 facing away from the side 600 may be a north pole, that the pole of the second magnet 610 facing away from the side 600 may be a south pole, that the pole of the third magnet 626 facing away from the side 620 may be a south pole, and that the pole of the fourth magnet facing away from the side 620 may be a north pole.

Accordingly, when the side 620 is oriented to be placed flat against (or at least adjacent to) the side 600 so that the connectors 604 and 624 align and so that the magnets 608 and 626 correspondingly align, the north pole of the magnet 608 and the south pole of the magnet 626 attract each other, thereby guiding the connectors 604 and 624 into place to connect with each other (e.g., in an interference fit) so that the devices 600, 622 may exchange data and/or power. Also note that when the side 620 is oriented to be placed flat against the side 600 as just described, the south pole of the magnet 610 and the north pole of the magnet 628 attract each other as well.

Conversely, if the side 620 were to be oriented to be placed flat against (or at least adjacent to) the side 600 but with one of the sides 600, 620 rotated one hundred eighty degrees in a plane established by the side relative to the orientation described in the paragraph above, the connectors 604 and 624 would not align but would be distanced from each other, and the magnets 608 and 626 correspondingly would not align. Moreover, the north pole of the magnet 608 and the north pole of the magnet 628 may repel each other, and the south pole of the magnet 610 and the south pole of the magnet 626 may repel each other, thereby making it difficult to place the side 600 flat against the side 620 in this orientation.

Figure 7:
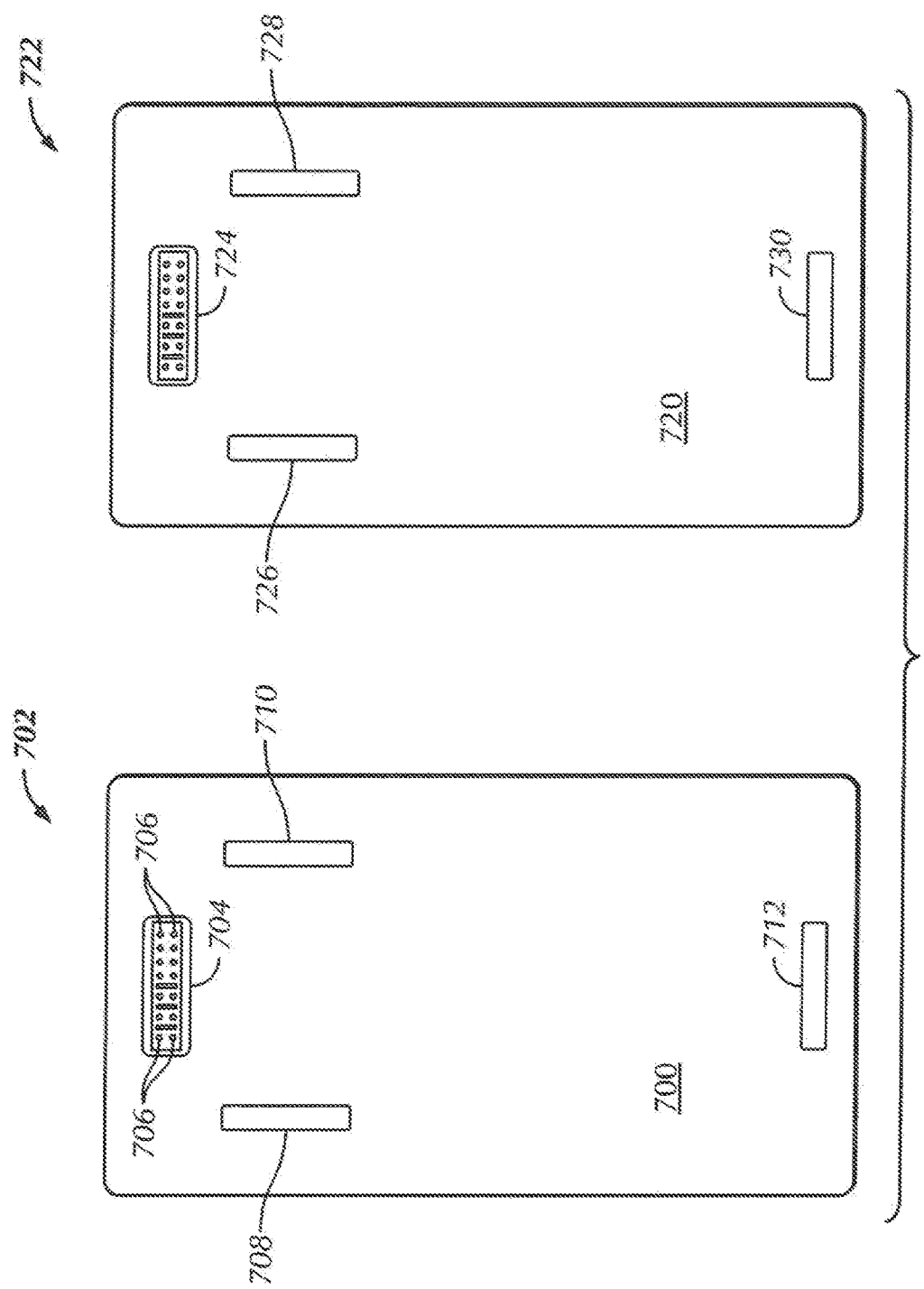

Before moving on to the description of FIG. 7, it is to be understood that when a pole of a magnet as referenced herein, is disclosed as facing away from a side of a housing of a device, the pole need not necessarily be facing away from the side at an angle orthogonal to a plane established by the side, but instead may be facing away at another angle (e.g., between orthogonal to the plane and forty five degrees relative to the plane) that still allows the pole of the magnet facing away from the side to repel a pole of another magnet on another device that is of the same pole type when juxtaposed adjacent to each other. Notwithstanding, it is to be understood that in at least some embodiments, the poles of magnets on a same side of a device may face away from the side in at least substantially the same direction (e.g., within a threshold number of degrees, such as five degrees).

Now describing FIG. 7, it shows a side 700 of a housing of a device 702 that may be substantially similar in function and configuration to any of the devices 302-308 described above. As may be appreciated from FIG. 7, the side 700 has a connector 704 coupled to the housing of the device 702 so that it is accessible via the side 700, exposed from the side 700, and/or faces away from the side 700 to engage with another device for the device 702 to exchange data and/or power with the other device in accordance with present principles. Note that the connector 704 may have one or more pogo pins 706 as shown.

Also shown coupled to the side 700 are a first magnet 708, a second magnet 710, and a third magnet 712. It is to be understood that the first magnet 705 may be coupled to the side 700 so that a pole of the first magnet 708 faces away from the device 700, while the second magnet 710 may be coupled to the side 700 so that a pole of the second magnet 708 faces away from the device 700, and while the third magnet 712 may be coupled to the side 700 so that a pole of the third magnet 712 faces away from the device 700. The poles of the magnets 708, 710, and 712 facing away from the device 702 may be of the same or different pole types (e.g., north and south) as each other. For example, in one example embodiment, poles of the magnets 708, 710 facing external to the side 700 may be north poles, while the pole of the magnet 712 facing external to the side 700 may be a south pole.

Thus, to provide an example in reference to FIG. 7, suppose the side 700 is a top side of a device in accordance with present principles. A bottom side 720 of a housing of another device 722 may have a connector 724 reciprocal to the connector 704 that is coupled to the housing of the device 722 to engage the connector 704 to exchange data and/or power between the devices 702, 722 in accordance with present principles. The side 720 may also hear a fourth magnet 720, a fifth magnet 728, and a sixth magnet 730. The fourth magnet 726 may be coupled to the side 720 so that a pole of the fourth magnet 726 faces away from the side 720, the fifth magnet 728 may be coupled to the side 720 so that a pole of the fifth magnet 728 faces away from the side 720, and the sixth magnet 730 may be coupled to the side 720 so that a pole of the sixth magnet 730 faces away from the side 720.

Accordingly, if poles of the magnets 708, 710 facing external to the side 700 are north poles, and if the pole of the magnet 712 facing external to the side 700 is a south pole as referenced above, the poles of the magnets 726-728 facing external to the device 722 may be south poles, and the pole of the magnet 730 maybe a north pole. Accordingly, when the sides 700 and 720 are juxtaposed next to each other so that the magnets 708 and 728 attract, the magnets 710 and 726 attract, and the magnets 712 and 730 attract, surface areas of the magnets (that may be established by planes of the magnets respectively parallel to planes established by the sides 700, 720 and from which the respective poles face away) may be covered (e.g., completely) by their reciprocal magnets, and the magnets based on their attraction may guide the connectors 704 and 724 together in a proper alignment so that the connectors 704, 724 may be engaged with each other (e.g., in an interference fit) to exchange data and/or power in accordance with present principles.

Conversely, if the side 720 were to be oriented to be placed flat against (or at least adjacent to) the side 700 but with one of the sides 700, 720 rotated one hundred eighty degrees in a plane established by the side relative to orientation described in the paragraph above, the connectors 704 and 724 would not align but would be distanced from each other, the magnets 708 and 728 would not align, the magnets 710 and 726 would not align, and the magnets 712 and 730 would not align. Moreover, the north poles of the magnets 708, 710 and the north pole of the magnet 730 may repel, each other, and the south pole of the magnet 712 and the south poles of the magnets 726, 728 may repel each other (which in some instances may cause one of the devices to shift or twist relative to the other device), thereby making it difficult to place the side 700 flat against the side 720 in this orientation.

Based on the foregoing, it may be appreciated that devices with reciprocal magnet configurations may thus be stacked, top to bottom, with two, three, four, etc. devices arranged in a stack at a given time since, in at least some embodiments, connectors and magnets may be disposed on opposing sides of each device for such stacking.

Figure 8:
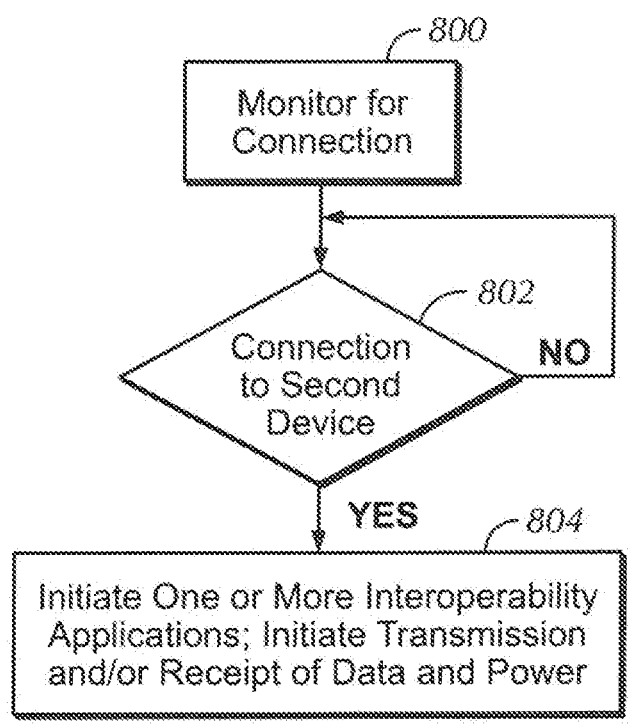
FIG. 8 is a flow chart showing an example algorithm in accordance with present principles.

Now in reference to FIG. 8, it shows example logic that may be executed by a device such as the system 100 and/or a device such as the devices 302-308 described above in accordance with present principles (referred to when describing FIG. 8 as the "present device"). Beginning at block 800, the logic monitors a connector in communication with and/or coupled to the present device tor a connection to and/or input from a connector of another device. The logic then moves to decision diamond 802 where the logic determines whether a connection and/or communication with another device via the other device's connector has been established, which may occur when a user properly juxtaposes two devices next to each other so that magnets on each de vice attract to join the connectors of each device.

A negative determination causes the logic to continue making the decision described above at diamond 802 until an affirmative determination is made. Then, once an affirmative determination, is made at diamond 802, the logic proceeds to block 804. At block 804 the logic, responsive to the affirmative determination at diamond 802, may do one or both of initiate one or more software applications stored at the present device, such as interoperability applications for the present device to exchange data and power with the other device, and/or initiate interoperability applications for communicating with a computer such as a laptop or convertible device to thus provide enhanced computing to the computer. In addition to or in lieu of the foregoing, but still at block 804 and responsive to the affirmative determination at diamond 802, the logic may initiate transmission and/or receipt of data and/or power between the joined devices.

Before concluding, it is to be understood in accordance with present principles that sides of magnets having poles lacing away from sides of devices in accordance with present principles may be coupled to and disposed external the respective device sides. However, they may also be disposed internal to the respective device sides so that they are not visible from outside the device when looking at the respective sides, but with the magnets still being able to attract and repel other magnets disposed on another device.

Also before concluding, it is to be understood that although a software application for undertaking present principles, such as the logic of FIG. 8, may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular DEVICE WITH MAGNET(S) FOR ENGAGING WITH ANOTHER DEVICE is herein shown and described in detail, it is to be understood that the subject matter which is encompassed by the present application is limited only by the claims.

What is claimed is:

1. A first device, comprising:
   a housing;
   at least one system component housed by the housing;
   a connector coupled to the housing that engages with a second device for the at least one system component to exchange at least one of data and power with the second device;
   a first magnet coupled to the housing, the first magnet positioned on the first device to attract a second magnet coupled to the second device when the first device is placed in a first orientation relative to the second device, the first magnet positioned on the first device to repel a third magnet coupled to the second device when the first device is placed in a second orientation relative to the second device;
   a fourth magnet coupled to the housing, the fourth magnet positioned on the first device to attract the third magnet when the first device is placed in the first orientation relative to the second device, the fourth magnet positioned on the first device to repel the second magnet when the first device is placed in the second orientation relative to the second device; and
   a fifth magnet coupled to the housing, the fifth magnet positioned on the first device to attract a sixth magnet coupled to a third device when the first device is placed in a first orientation relative to the third device, the fifth magnet positioned on the first device to repel a seventh magnet coupled to the third device when the first device is placed in a second orientation relative to the third device.

2. The first device of claim 1, wherein the first magnet is positioned on the first device so that a first pole of the first magnet faces away from the first device.

3. The first device of claim 1, wherein the first magnet is positioned on the first device so that a first pole of the first magnet faces away from the first device, and wherein the fourth magnet is positioned on the first device so that a first pole of the fourth magnet faces away from the first device.

4. The first device of claim 1, wherein the first magnet is positioned on the first device so that a first pole of the first magnet faces away from the first device in a first direction, wherein the fourth magnet is positioned on the first device so that a first pole of the fourth magnet faces away from the first device in the first direction, and wherein the fifth magnet is positioned on a first side of the first device opposing a second side of the first device at which the first magnet and the second magnet are disposed so that a first pole of the fifth magnet faces away from the first device in a second direction opposite the first direction.

5. The first device of claim 1, wherein the connector comprises at least one pogo pin.

6. The first device of claim 1, wherein the at least one system component comprises at least one of a speaker, a processor, a power supply, a Bluetooth communication element, a hard drive, a router, and a projector.

7. The first device of claim 1, wherein the at least one system component comprises a processor and storage accessible to the processor, and wherein the storage bears instructions executable by the processor to exchange data with the second device in response to connection of the connector with a reciprocal connector on the second device.

8. The first device of claim 3, wherein the first pole of the first magnet is a north pole and the first pole of the second magnet is a south pole.

9. The first device of claim 3, wherein the first pole of the first magnet and the first pole of the fourth magnet face away from the first device in at least substantially the same direction.

10. The first device of claim 4, wherein the first pole of the first magnet is a north pole and the first pole of the fourth magnet is a south pole.

11. The first device of claim 8, wherein the first pole of the first magnet and the first pole of the fourth magnet face away from the first device in at least substantially the same direction.

12. A method, comprising:
    providing a housing on a first device,
    providing at least one system component housed by the housing;
    providing a connector coupled to the housing that engages with a second device for exchange, between the first device and the second device, of at least one of data and power; and
    providing at least a first magnet coupled to the housing, the first magnet coupled to the housing so that a first pole of the first magnet faces away from the first device to repel a first pole of a second magnet coupled to the second device when the first device is juxtaposed next to the second device in a first orientation relative to the second device, the first magnet not being an electrical connector for the first device.

13. The method of claim 12, wherein the first magnet is coupled to the housing so that the first pole of the first magnet faces away from the first device to attract a first pole of a third magnet coupled to the second device when the first device is juxtaposed next to the second device in a second orientation relative to the second device that is different from the first orientation.

14. The method of claim 12, wherein the providing of at least one system component housed by the housing comprises providing at least a processor and storage accessible to the processor, and wherein the storage bears instructions executable by the processor to initiate an application stored at the first device in response to connection of the connector with a reciprocal connector on the second device.

15. The method of claim 13, wherein the first pole of the first magnet is of a different pole type than the first pole of the second magnet, and wherein the first pole of the first magnet is of a same pole type as the first pole of the third magnet.

16. A system, comprising:
   a housing on a first device;
   at least one system component housed by the housing;
   a connector coupled to the housing that engages with a second device for exchange, between the first device and the second device, of at least one of data and power;
   a first magnet coupled to the housing and not being a connector to exchange data or power with the second device, the first magnet coupled to the housing so that a first pole of the first magnet faces away from the first device to repel a first pole of a second magnet coupled to the second device when the first device is juxtaposed next to the second device in a first orientation relative to the second device.

17. The system of claim 16, comprising the first device and the second device.

18. The system of claim 17, wherein the second device comprises:
   a housing;
   at least one system component housed by the housing of the second device;
   a connector coupled to the housing of the second device that engages with a connector of the first device for exchange, between the first device and the second device, of at least one of data and power; and
   the second magnet.

* * * * *